United States Patent
McCormick

(10) Patent No.: US 6,582,164 B1
(45) Date of Patent: Jun. 24, 2003

(54) ROLLER TWIST DRILL

(75) Inventor: Michael R. McCormick, Greensburg, PA (US)

(73) Assignee: Kennametal Inc., Latrobe, MA (US)

(*) Notice: Subject to any disclaimer, the term of this patent is extended or adjusted under 35 U.S.C. 154(b) by 0 days.

(21) Appl. No.: 10/082,672

(22) Filed: Feb. 25, 2002

(51) Int. Cl.$^7$ ................................................ B23B 51/02
(52) U.S. Cl. .................... 408/226; 408/144; 408/230; 408/713
(58) Field of Search ................................ 408/144, 226, 408/230, 231, 232, 233, 713, 200

(56) References Cited

U.S. PATENT DOCUMENTS

| 756,339 | A | * | 4/1904 | Down | 408/233 |
|---|---|---|---|---|---|
| 4,072,438 | A | | 2/1978 | Powers | 408/59 |
| 5,340,246 | A | | 8/1994 | Tukala | 408/233 |
| 5,863,162 | A | | 1/1999 | Karlsson et al. | 408/230 |
| 5,904,455 | A | | 5/1999 | Krenzer et al. | 408/144 |
| 5,957,631 | A | | 9/1999 | Hecht | 408/144 |
| 5,971,676 | A | | 10/1999 | Kojima | 408/231 |
| 5,988,953 | A | | 11/1999 | Berglund et al. | 408/1 R |
| 6,012,881 | A | * | 1/2000 | Scheer | 408/227 |
| 6,019,553 | A | | 2/2000 | Yakamavich, Jr. | 408/224 |
| 6,059,492 | A | | 5/2000 | Hecht | 408/144 |
| 6,109,841 | A | * | 8/2000 | Johne | 408/144 |
| 6,506,003 | B1 | * | 1/2003 | Erickson | 408/226 |
| 2002/0159851 | A1 | * | 10/2002 | Krezner | 408/230 |

FOREIGN PATENT DOCUMENTS

| DE | 2246965 | 4/1974 |
|---|---|---|
| DE | 0094340 | 10/1987 |

* cited by examiner

Primary Examiner—Daniel W. Howell
(74) Attorney, Agent, or Firm—Larry R. Meenan

(57) ABSTRACT

A drill comprises a drill body and a removable tip. The drill body has a main body portion, a thread, and a reduced diameter portion between the main body portion and the thread. The removable tip has a main body portion and a thread that is adapted to engage the thread of the drill body. One of the threads is an internal thread within a connection bore. The other thread is an external thread extending from a shaft. The internal thread is defined by a front face, a rear face, and a radial surface extending between the front and rear faces. The external thread is also defined by a front face, a rear face, and a radial surface extending between the front and rear faces. The shaft is adapted to be inserted in the connection bore and rotated to engage the internal and external threads with one another.

25 Claims, 8 Drawing Sheets

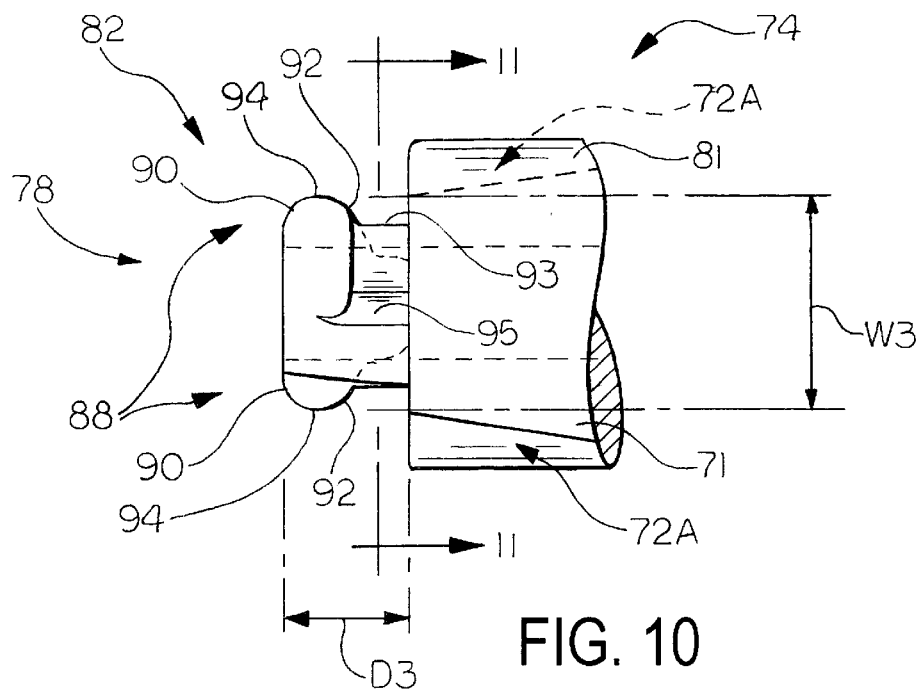
FIG. 10
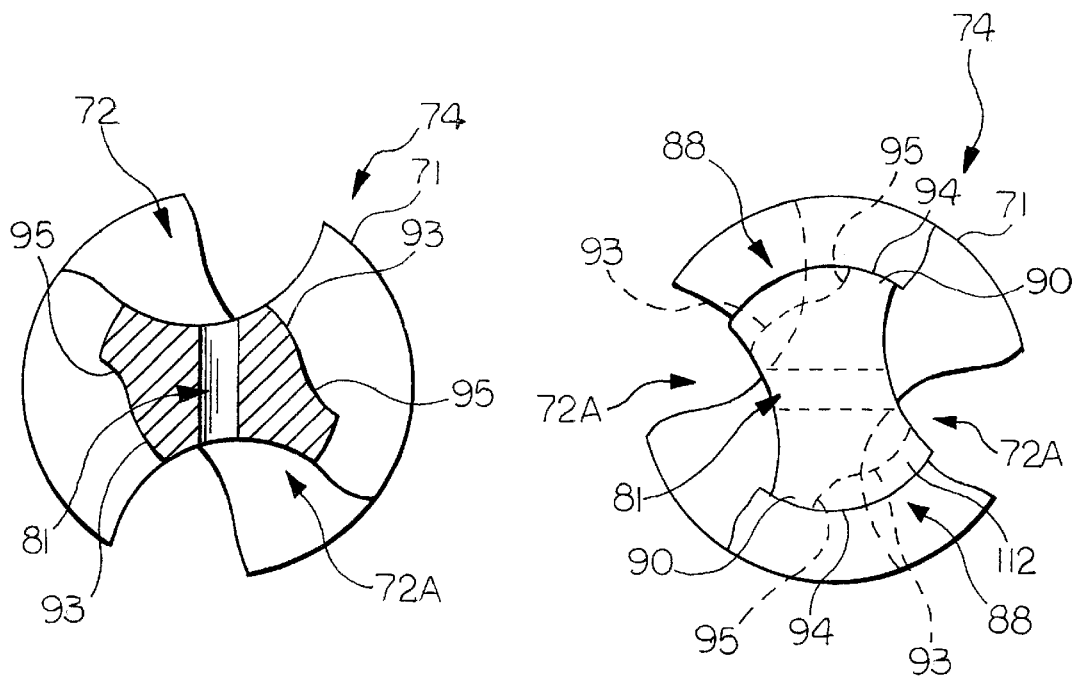
FIG. 11
FIG. 12

ROLLER TWIST DRILL

BACKGROUND OF THE INVENTION

1. Field of the Invention

This invention generally relates to tools and more particularly relates to machining tools. Most particularly, this invention relates to drills for use with machining centers.

2. Description of the Related Art

Drills are cutting tools that are adapted for use with rotary machines, often referred to as machining centers. A conventional drill includes a body having a shank and a head at the front end of the shank. The head is provided with a cutting edge. A flute extends rearward from the cutting edge along the drill body. The flute is provided for the evacuation of material removed from a work piece by the cutting edge.

In operation, the shank of the drill is supported by a spindle, which is an integral part of the machining center. The spindle is operable to rotate the drill about its central axis. The spindle can be displaced in an axial direction to displace the drill relative to a work piece. Alternatively, the spindle can be axially fixed and the work piece can be displaced in an axial direction relative to the drill. As the spindle or work piece is displaced in an axial direction, the spindle rotates. As the spindle rotates, the cutting edge removes material from the work piece. The material removed is evacuated by the flutes.

Throughout the use of the drill, its cutting edge becomes worn. The cutting edge could eventually become so worn that further use of the drill would be ineffective or inefficient. When this occurs, the worn drill is replaced with a fresh drill.

While the fresh drill is in use, the worn cutting edge can be sharpened for later use. The cutting edge is sharpened by removing material from the head of the drill. Subsequent sharpening operations further remove material from the head of the drill. Ultimately, the length of the drill becomes too short for further sharpening. Consequently, the drill can no longer be used. When this occurs, the drill is reduced to scrap.

To promote a conservation of natural resources and avoid sharpening operations, replaceable inserts have been devised for use with drills. An insert is a generally planar body having a cutting edge. The insert is adapted to be secured in a pocket provided in the head of the drill. Examples of inserts are disclosed in U.S. Pat. No. 4,072,438, to Powers, U.S. Pat. No. 5,340,246, to Tukala, and U.S. Pat. No. 6,019,553, to Yakamavich, Jr.

While cutting inserts are capable of conserving resources and avoiding sharpening operations, the manner in which an insert is secured in a pocket can be inefficient. To solve this inefficiency problem, replaceable tips have been devised for use with drills. A replaceable tip comprises a generally cylindrical body having a cutting edge at its front end. A flute in the tip extending rearward of the cutting edge is adapted to align with a flute in the drill body when the tip is supported by the drill body.

An example of a replaceable tip for use with drills is disclosed in U.S. Pat. No. 6,059,492, to Hecht. This replaceable tip encounters deformation throughout use. The deformation causes the tip and the drill body to become loose relative to one another so that the tip is prone to separate from the body. The tip can become separated from the drill body in the work piece. Extracting the tip from the work piece can be cumbersome if not impossible.

What is needed is a drill that overcomes all of the shortcomings of the aforementioned inserts and tips. In particular, a drill body and a removable drill tip, which do not deform and separate throughout use, are needed.

SUMMARY OF THE INVENTION

Generally speaking, the invention is directed toward a drill comprising a drill body and a removable tip. The drill body has a main body portion, a thread, and a reduced diameter portion between the main body portion and the thread. The removable tip has a main body portion and a thread that is adapted to engage the thread of the drill body. One of the threads is an internal thread within a connection bore. The other thread is an external thread extending from a shaft. The internal thread is defined by a front face, a rear face, and a radial surface extending between the front and rear faces. The external thread is also defined by a front face, a rear face, and a radial surface extending between the front and rear faces. The shaft is adapted to be inserted in the connection bore and rotated to engage the internal and external threads with one another.

BRIEF DESCRIPTION OF THE DRAWINGS

Further features of the present invention, as well as the advantages derived therefrom, will become clear from the following detailed description made with reference to the drawings in which:

FIG. 10 is a partial top plan view of the drill body illustrated in FIGS. 8 and 9 with portions of its chip flutes shown in hidden lines;

FIG. 11 is a sectional view of the drill body taken along the line 11—11 in FIG. 10;

FIG. 12 is a front elevational view of the drill body illustrated in FIGS. 8 and 9 with portions of its chip flutes and its threads shown in hidden lines;

DESCRIPTION OF THE PREFERRED EMBODIMENT

Figure 1:
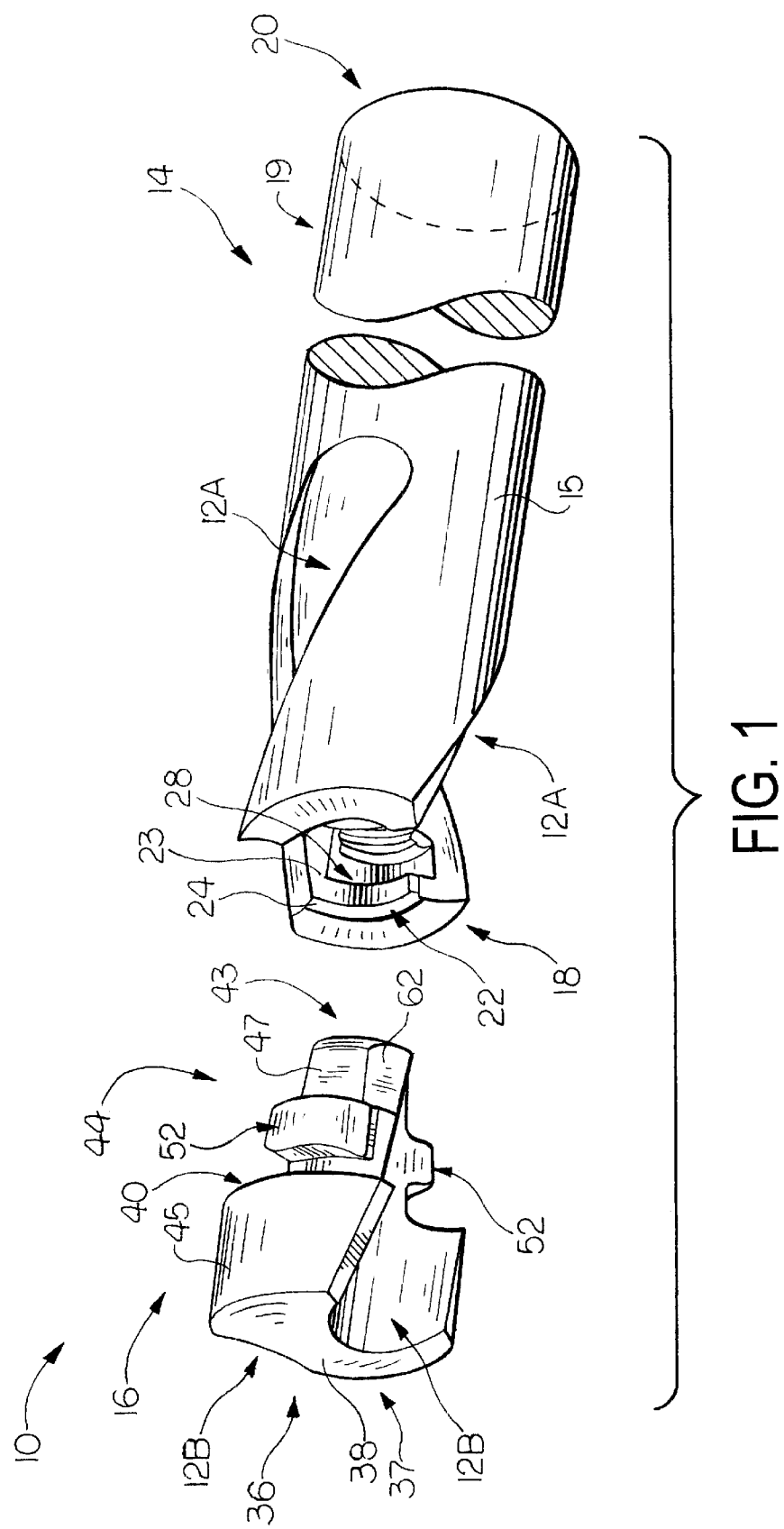
FIG. 1 is an exploded front perspective view of a drill according to the invention.
Figure 2:
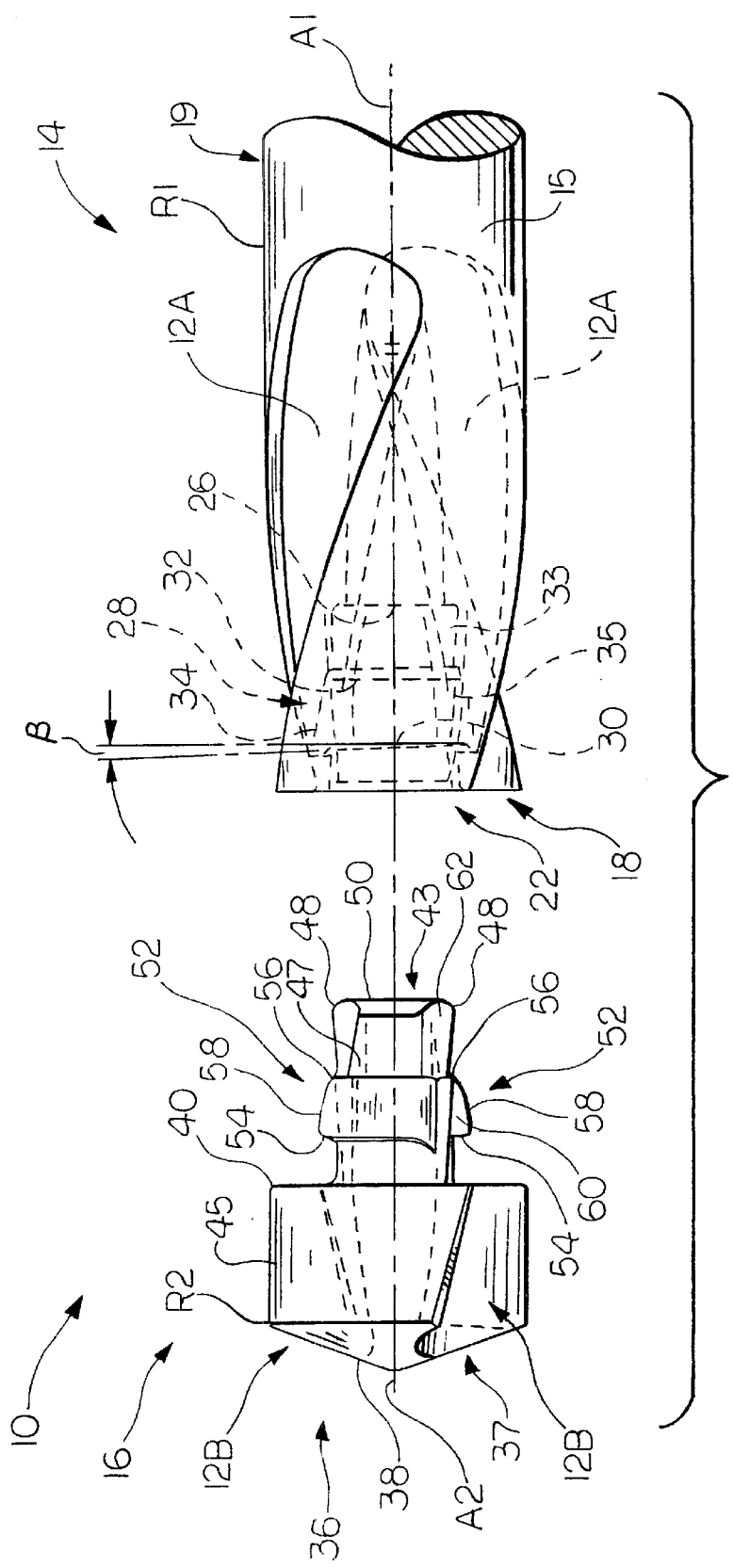
FIG. 2 is a partial exploded side elevational view of the drill shown in FIG. 1.

With reference now to the drawings, wherein like numerals designate like components, a drill 10 of the invention is illustrated in FIGS. 1 and 2. The drill 10 is adapted for use on a machining center (not shown) wherein the machining center has a spindle for receiving the drill and means for rotating the spindle. A plurality of cutting edges can be uniformly spaced at the front end of the drill 10 for cutting a work piece (not shown) during a machining operation. Chip flutes, generally indicated at 12A, 12B, can be provided along the drill 10 to provide space for the evacuation and expulsion of metal chips and liquid coolant.

Figure 3:
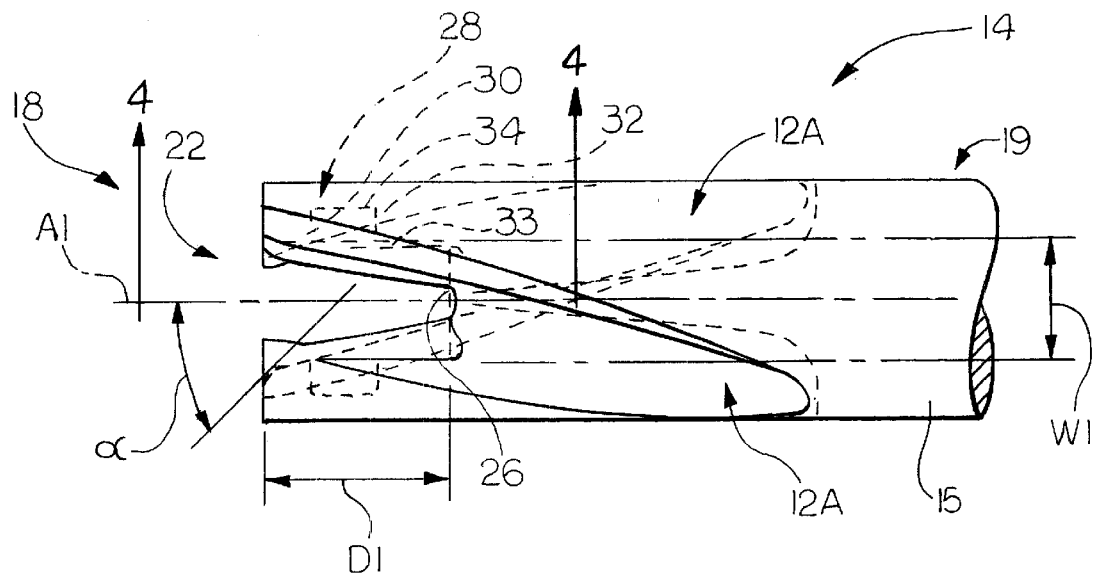
FIG. 3 is a partial top plan view of the drill body illustrated in FIG. 2 with its connection bore, one of its chip flutes, and its internal threads shown in hidden lines.
Figure 4:
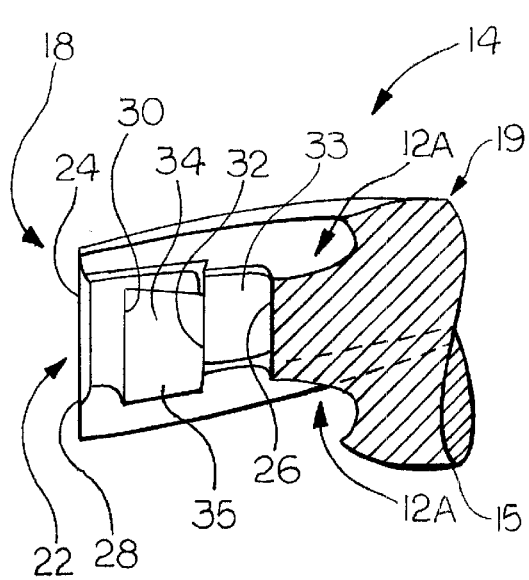
FIG. 4 is a sectional view of the front end of the drill body taken along the line 4—4 in FIG. 3.
Figure 5:
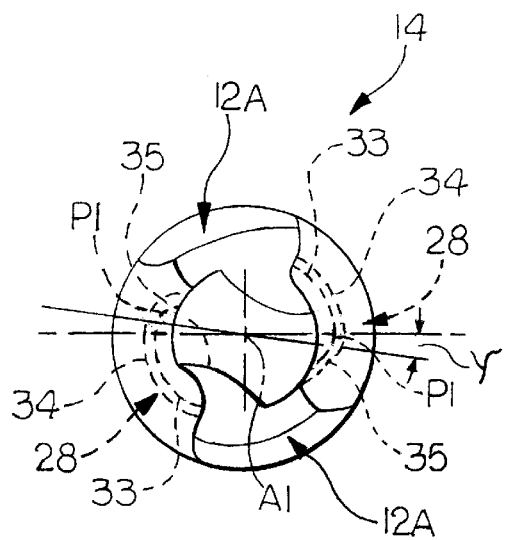
FIG. 5 is a front elevational view of the drill body illustrated in FIGS. 1–3 with its threads shown in hidden lines.
Figure 6:
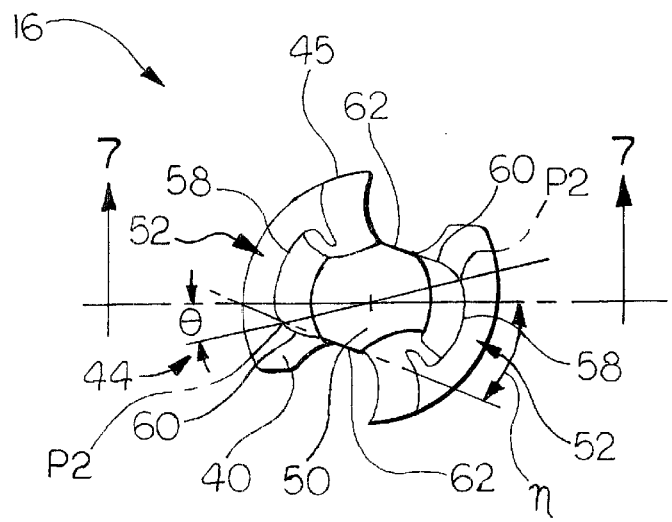
FIG. 6 is a rear elevational view of the removable tip illustrated in FIGS. 1 and 2.
Figure 7:
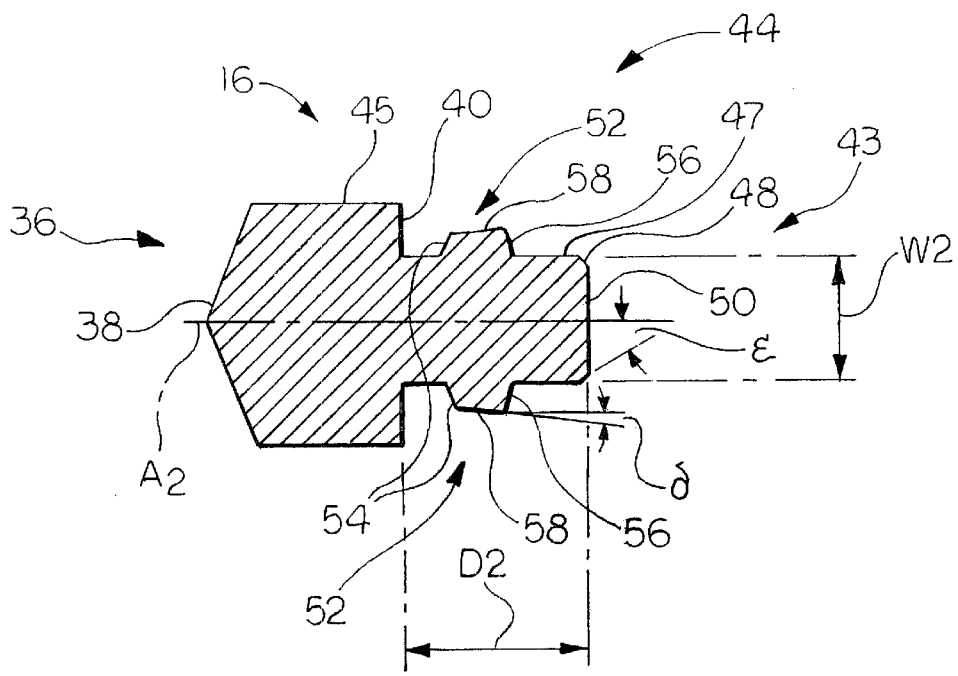
FIG. 7 is a sectional view of the removable tip taken along the line 7—7 in FIG. 6.

The drill 10 includes a drill body, generally indicated at 14, which is also shown in FIGS. 3–5, and a removable tip, generally indicated at 16, which is also shown in FIGS. 6 and 7. The removable tip 16 is adapted to be connected to the drill body 14.

In the preferred embodiment, the drill body 14 is an elongate generally cylindrical structure defined by an outer substantially cylindrical wall 15 having a radius indicated at R1 (shown in FIG. 2). The drill body 14 has a front end, generally indicated at 18, and a rear end, generally indicated at 20. The drill body 14 has chip flutes 12A that are defined by elongate slots in the cylindrical wall 15. The flutes 12A are preferably defined by slots that spiral at an angle (for example, 45 degrees) relative to the central axis A1 of the drill body 14. Although spiral flutes are shown, the flutes may extend straight and parallel to the central axis A1 of the drill body 14. However, spiral flutes result in a greater angular coverage between the drill body 14 and the removable tip 16 than would be achieved with straight flutes.

A main body portion, generally indicated at 19, is provided at the rear end 20 of the drill body 14. The main body portion 19 functions as a tool shank that is adapted to be clamped in the spindle of the machining center (not shown).

A connection bore 22 is provided at the front end 18 of the drill body 14. The connection bore 22 is adapted to receive a portion of the removable tip 16. As clearly shown in the drawings, the connection bore 22 is only partially defined by the cylindrical structure of the drill body 14 due to the presence of the chip flutes 12A. As shown in the drawings, the connection bore 22 is defined by an inner cylindrical wall 23. The connection bore 22 is preferably provided with a chamfered surface 24 at the front end 18 of the drill body 14. The chamfered surface 24 is provided for guiding the removable tip 16 into the connection bore 22 and reducing interference between the removable tip 16 and the connection bore 22. The chamfered surface 24 is preferably oriented at an angle a (for example, 45 degrees) relative to the central axis A1 of the drill body 14, as shown in FIG. 3. The connection bore 22 terminates in a terminal surface 26 toward the rear end 20 of the drill body 14.

As shown in FIG. 3, the width or diameter of the connection bore 22 is indicated at W1 (shown in FIG. 3) and the depth of the connection bore 22 is indicated as D1 (shown in FIG. 3). These dimensions are important for proper interface of the dill body 14 and the removable tip 16.

An internal thread 28 extends from the connection bore 22. In a preferred embodiment of the invention, diametrically opposed internal threads 28 extend outwardly from the connection bore 22. Each internal thread 28 is defined by a front face 30, a rear face 32, and a radial surface 34 extending axially between the front and rear faces 30, 32. The front face 30 of each external thread 28 is preferably disposed at an angle β (for example, 2 degrees) relative to a plane extending perpendicularly through the central axis A1 of the drill body 14, as shown in FIG. 3. The rear face 32 of each internal thread 28 is separated, or spaced apart, from the main body 19 by a reduced diameter portion 33 of the connection bore 22. A portion of the radial surface 34 of each internal thread 28 has a diminishing radius that defines a drive face 35. The drive face 35 of each thread 28 starts at a point P1 located in a plane that is at an angle γ (for example, about 5 degrees) relative to a plane passing through the central axis A1 of the drill body 14, as shown in FIG. 5.

With reference now to FIGS. 6–7, the removable tip 16 comprises a cutting tip, generally indicated at 36, at the front end 37 thereof. The cutting tip 36 is a generally cylindrical structure. The cutting tip 36 has a front end, generally indicated at 38, and a rear face, generally indicated at 40. The cutting tip 36 is defined by an outer cylindrical wall 45 having a radius R2 (shown in FIG. 2) which is substantially the same as the radius R1 of the outer cylindrical wall 19 of the drill body 14. The removable tip 16 has chip flutes 12B that are defined by elongate slots in the cylindrical wall 19. The flutes 12B are preferably defined by slots that spiral at an angle (for example, about 45 degrees) relative to the central axis A2 of the removable tip 16. The flutes 12B are adapted to align with the chip flutes 12A in the drill body 14, as shown in FIGS. 1 and 2. Similar to the flutes 12A above, the flutes 12B can be straight flutes that extend parallel to the central axis A2 of the removable tip 16, provided the flutes 12A in the drill body 14 are likewise straight flutes.

The front end 37 of the removable tip 16 is adapted to support cutting edges. The cutting edges facilitate in the removal of material from a work piece (not shown). Material removed is evacuated through and expelled from the chip flutes 12.

A rear end 43 of the removable tip 16 defines a shaft 44 that is adapted to be inserted in the connection bore 22 in the front end 18 of the drill body 14. Similar to the connection bore 22 above, the shaft 44 of the removable tip 16 is only partially defined by the cylindrical structure forming the removable tip 16 due to the presence of the chip flutes 12B. As stated above, spiral flutes result in a greater angular coverage between the drill body 14 and the removable tip 16 than would be achieved with straight flutes. Hence, spiral flutes are preferred.

As shown in the drawings, the shaft 44 of the removable tip 16 is at least partially defined by an outer cylindrical wall 47. The shaft 44 preferably has a chamfered surface 48 toward the rear end 43 of the removable tip 16. The chamfered surface 48 is provided for guiding the removable tip 16 into the connection bore 22 and reducing interference between the tip 16 and the connection bore 22. The chamfered surface 48 is preferably oriented at an angle ε (for example, 30 degrees) relative to the central axis A2 of the removable tip 16, as shown in FIG. 7. The shaft 44 terminates in a terminal surface 50 at the rear end 43 of the removable tip 16.

The width or diameter of the shaft 44 is indicated at W2 and the depth of the shaft 44 is indicated as D2, shown in FIG. 7. As stated above, these dimensions are important for proper interface of the drill body 14 and the removable tip 16. For example, the depth D1 of the connection bore 22 is greater than the depth D2 of the shaft 44 and the width W1 of the connection bore 22 is greater than the width W2 of the shaft 44. This permits the shaft 44 to fit in the connection bore 22.

An external thread 52 extends from the shaft 44 of the removable tip 16. In a preferred embodiment, diametrically opposed external threads 52 extend from the shaft 44 between the cutting tip 36 and the terminal surface 50 at the rear end 43 of the removable tip 16. Each external thread 52 is defined by a front face 54, a rear face 56, and a radial surface 58 that extends axially between the front face 54 and the rear face 56. The front and rear faces 54, 56 of the external thread 52 lie in planes that are generally perpendicular to the central axis A2 of the removable tip 16. However, the radial surface 58 tapers towards the front end of the removable tip 16 at an angle δ (for example, about 2 degrees). The tapered radial surface 58 is provided for guiding the external threads 52 into the internal threads 28 and for reducing interference between external threads 52 and the internal threads 28. Moreover, opposing portions 62 of the shaft 44 of the removable tip 16 are non-cylindrical. These non-cylindrical portions 62 are oriented at an angle η (for example, about 35 degrees) measured from the central axis A2 of the removable tip 16. In addition, a portion of the radial surface 58 of each external thread 52 has a diminishing radius that defines a drive face 60, similar to the drive face 35 of each internal thread 28. The drive face 60 starts at a point P2 located in a plane at an angle θ (for example, about 9 degrees) relative to a plane passing through the central axis A2 of the removable tip 16, as shown in FIG. 6. The drive face 60 of each external thread 52 cooperates with the drive face 35 of a corresponding internal thread 28 to form an interference fit between the external threads 52 and the internal threads 28 and transmit rotating force from the drill body 14 to the removable tip 16.

In operation, the shaft 44 of the removable tip 16 is inserted into the connection bore 28. As the shaft 44 is inserted into the bore 28, the opposing external threads 52 enter corresponding flutes 12A in the drill body 14. With the external threads 52 aligned with corresponding internal threads 28, the removable tip 16 is twisted (for example, clockwise) relative to the drill body 14. This may be accomplished with a tool (not shown) that is adapted to engage the flutes 12B on the removable tip 16. As the removable tip 16 is twisted, the external threads 52 enter corresponding internal threads 28. Since the front face 30 of each internal thread 28 is disposed at an angle β and further since the radial surface 58 of each external thread 52 is tapered, the external threads 52 can be guided into the internal threads 28 with relative ease and with minimal interference from the internal threads 28. The interference fit between the drive faces 35, 60 of the internal threads 28 and the external threads 52 locks the removable tip 16 on the drill body 14.

The internal threads 28 are preferably located along an intermediate region of the connection bore 22 between the front end 18 of the drill body 14 and terminal surface 26 of the connection bore 22 toward the rear end 20 of the drill body 14. Similarly, the external threads 52 are preferably located along an intermediate region of the shaft 44 of the removable tip 16 between the cutting tip 36 and the rear end 43 of the removable tip 16.

Figure 8:
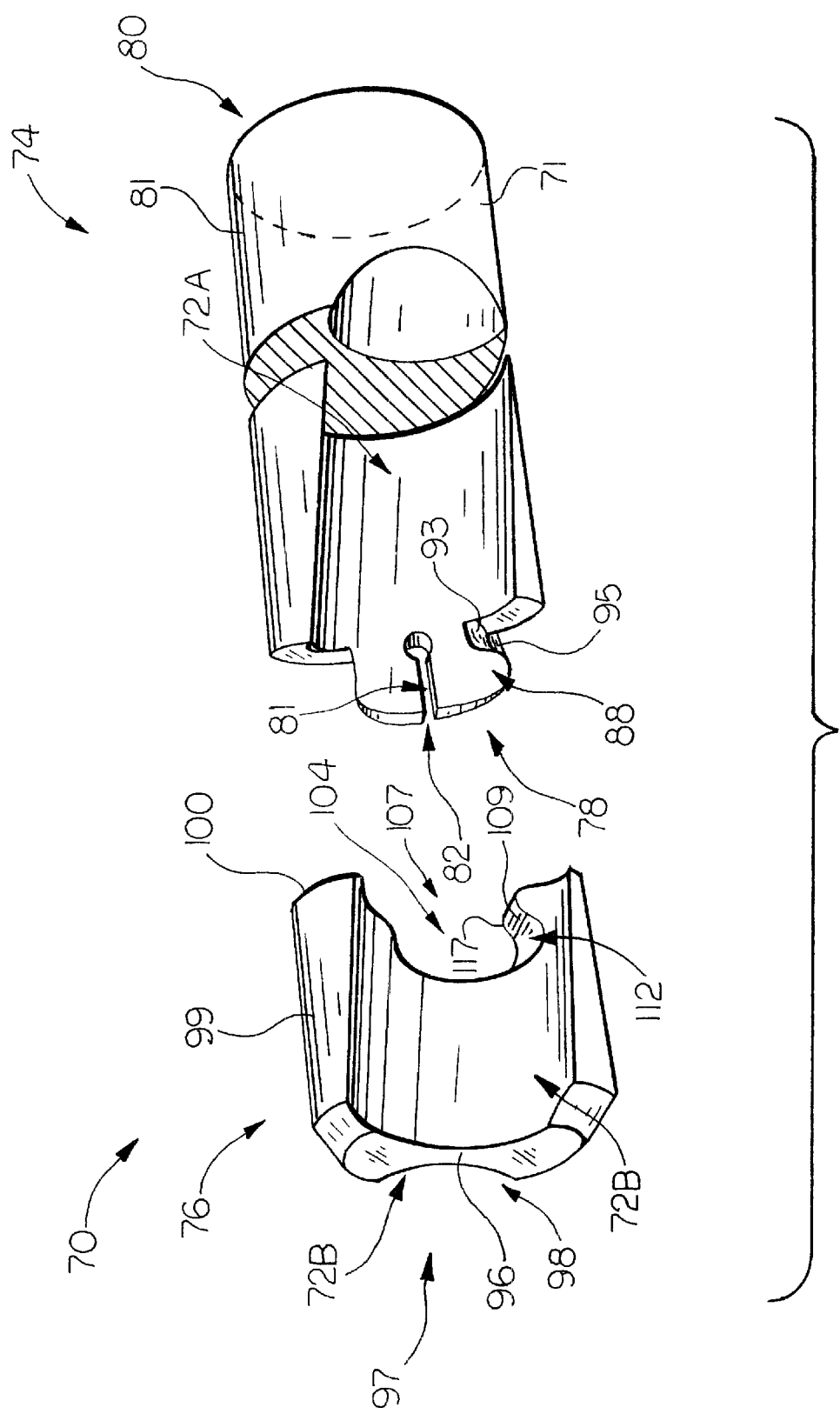
FIG. 8 is an exploded perspective view of another drill according to the invention.
Figure 9:
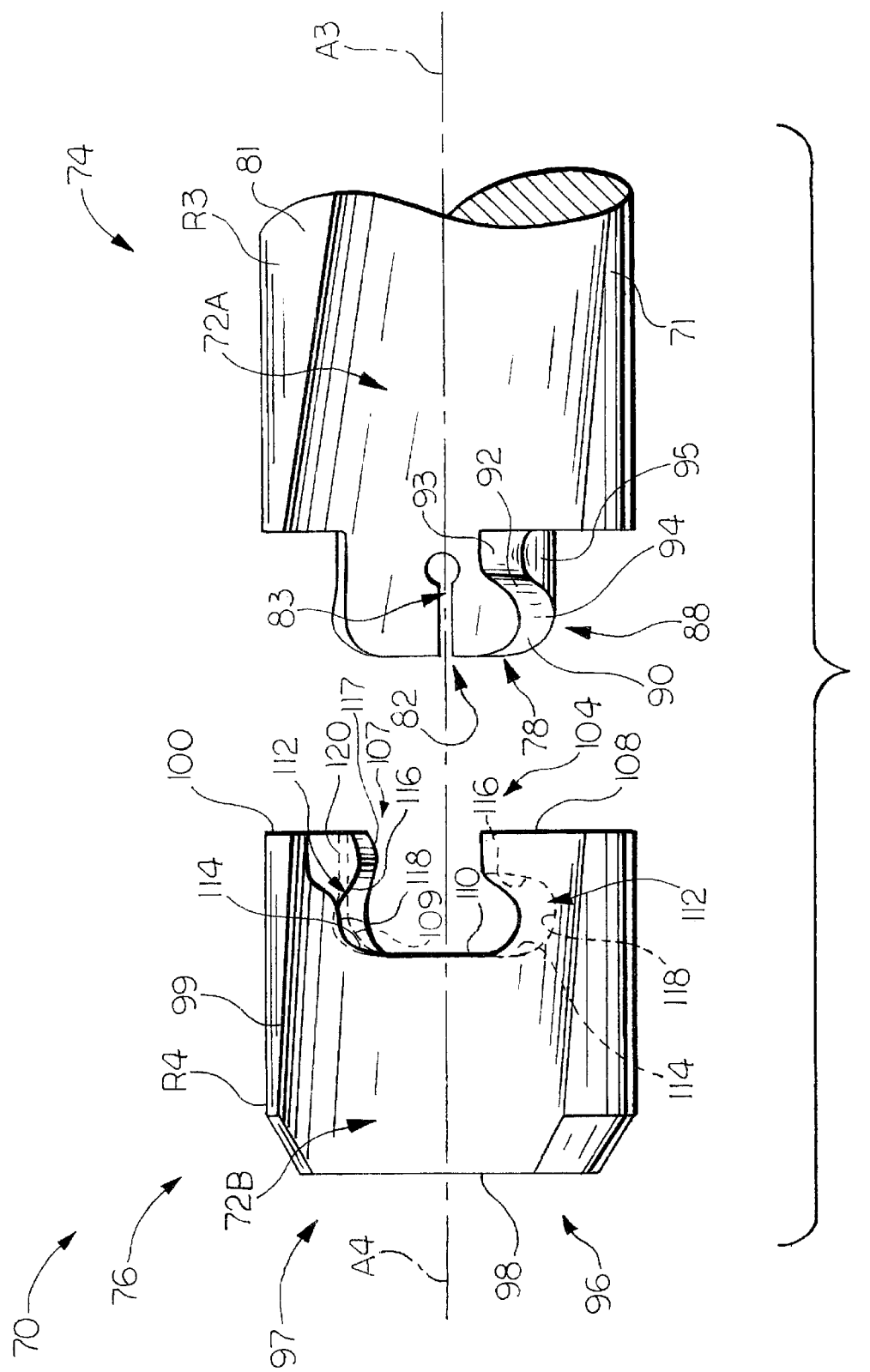
FIG. 9 is a partial exploded elevational view of the drill shown in FIG. 9.
Figure 13:
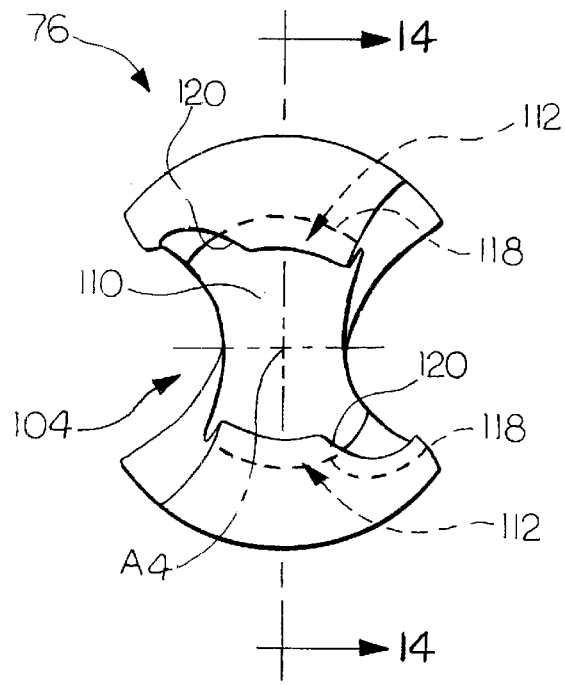
FIG. 13 is a rear elevational view of the removable tip illustrated in FIGS. 8 and 9.
Figure 14:
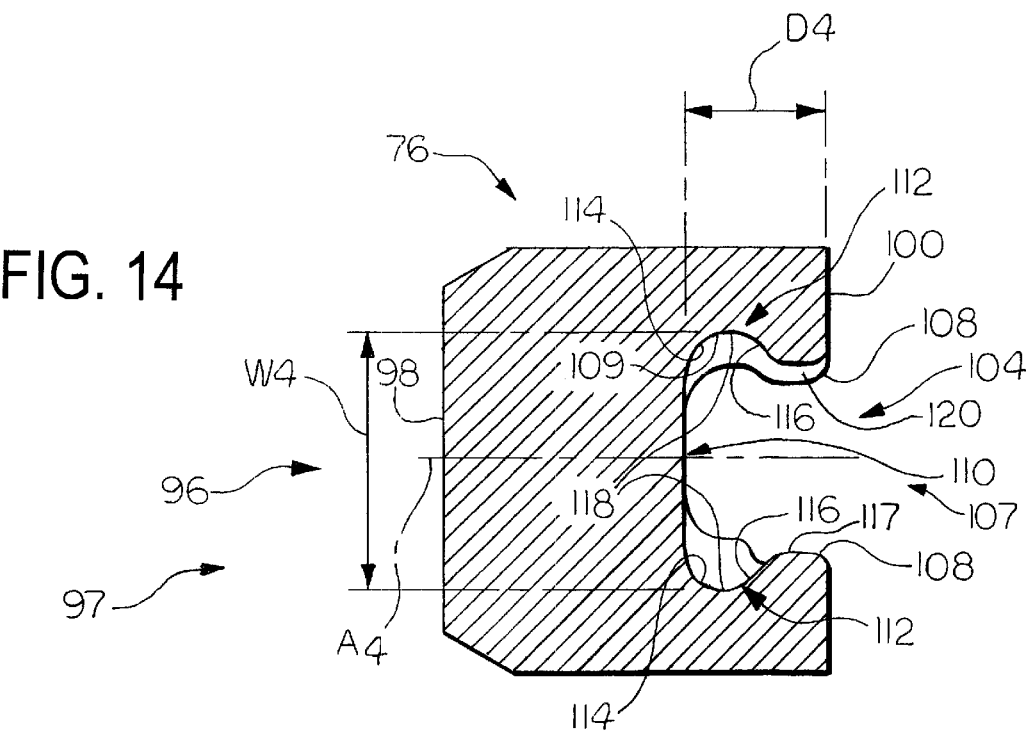
FIG. 14 is a sectional view of the removable tip taken along the line 14—14 in FIG. 13.

Another drill 70 is shown in FIGS. 8 and 9. This drill 70 includes a drill body, generally indicated at 74, which is also seen in FIGS. 10–12, and a removable tip, generally indicated at 76, which is seen in FIGS. 13 and 14. The removable tip 76 is adapted to be connected to the drill body 74.

Similar to the drill body 10 set forth above, this drill body 74 is an elongate generally cylindrical structure having a front end, generally indicated at 78, and a rear end 80. The drill body 74 is preferably defined by an outer substantially cylindrical wall 71. The drill body 74 has chip flutes 72A, which may be defined by elongate slots in the outer cylindrical wall 71. The flutes 72A are preferably in the form of slots that spiral at an angle (for example, about 45 degrees) relative to the central axis A3 of the drill body 74. Although spiral flutes are shown, straight flutes may extend parallel to the central axis A3 of the drill body 74.

The rear end 80 of the drill body 74 is defined by a main body portion, generally indicated at 81. The main body portion 81 functions as a tool shank that is adapted to be clamped in the spindle of a machining center (not shown).

As shown in FIGS. 10–12, the front end 78 of the drill body 74 is defined by a shaft 82. The shaft 82 is generally cylindrical. However, a portion of the shaft 82 is non-cylindrical due to the presence of the chip flutes 72A.

The shaft 82 is preferably provided with a slot 83. The slot 83 produces diametrically disposed shaft portions 72A, 72B. The slot 83 is defined by a transverse channel that extends along the axis A3 of the drill body 74. The slot 83 terminates in a transverse bore. The slot 83 functions to permit the shaft portions 72A, 72B to flex and thus reduces the risk of the shaft portions 72A, 72B breaking under stress throughout the use of the drill 70.

As illustrated in the drawings, an external thread 88 extends radially outward from the shaft 82 at the front end 78 of the drill body 74. In a preferred embodiment of the invention, opposing external threads 88 extend radially outward from the shaft 82. Each external thread 88 preferably has a chamfered front face 90 and a chamfered rear face 92. A radial surface 94 is provided between the front face 78 and the rear face 80. The rear face 80 is separated, or spaced apart, from the main body portion 81 of the drill body 74 by a reduced diameter portion 93 of the shaft 82 located between the main body portion 81 and the chamfered rear face 92 of the external threads 88. The reduced diameter portion 93 terminates in a drive face 95.

The removable tip 76 has a front end 97 comprising a cutting tip, generally indicated at 96. The cutting tip 96 is a generally cylindrical structure having a front end, generally indicated at 98, and a rear face, generally indicated at 100. The cutting tip 96 is defined by an outer cylindrical wall 99 having a radius R4, shown in FIG. 9, which is substantially equal to the radius R3 of the drill body 74. Chip flutes 72B are defined by elongate slots in the cylindrical wall 99. The flutes 72B are preferably defined by slots that spiral at an angle (for example, 45 degrees) relative to the axis A4 of the removable tip 76. The flutes 72B are adapted to align with the flutes 72A in the drill body 74. Similar to the flutes 72A in the drill body 74 above, the flutes 72B in the removable tip 76 can be straight flutes that extend parallel to the central axis A4 of the tip 76, provided the flutes 72A in the drill body 74 are likewise straight flutes.

The front end 97 of the removable tip 76 is adapted to support cutting edges. The removable tip 76 has a rear end 107 that defines a connection bore 104. The connection bore 104 is adapted to receive the shaft 82 at the front end 78 of the drill body 74. Similar to the shaft 82 of the drill body 74, the connection bore 104 of the removable tip 76 is only partially cylindrical due to the presence of the chip flutes 72B. As stated above, spiral flutes result in a greater angular coverage between the drill body 74 and the removable tip 76 than would be achieved with straight flutes. Consequently, spiral flutes are preferred.

As shown in the drawings, the connection bore 104 of the removable tip 76 is generally defined by an inner cylindrical wall 109. The connection bore 104 preferably has a chamfered surface 108 at the rear end 107 of the removable tip 76. The chamfered surface 108 is provided to assist in guiding the shaft 82 at the front end 78 of the drill body 74 into the connection bore 104 and reducing interference between the shaft 82 and the connection bore 104. The front end of the inner cylindrical wall 109 ends at a terminal surface 110.

The width or diameter of the connection bore 104 is indicated at W4 and the depth of the connection bore 104 is indicated as D4, as shown in FIG. 14. As stated above, these dimensions are important for proper interface of the drill body 74 and the removable tip 76. For example, the depth D4 of the connection bore 104 is greater than the depth D3 of the shaft 82 and the width W4 of the connection bore 104 is smaller than the width W3 of the shaft 82. This permits the shaft 82 to fit in the bore 104.

An internal thread 112 is located adjacent the terminal surface 110 of the connection bore 104 toward the front end 87 of the removable tip 76. In a preferred embodiment of the invention, opposing internal threads 112 are located adjacent the terminal surface 110 of the connection bore 104. Each internal thread 112 is defined by a front chamfered surface 114, a rear chamfered surface 116, and a radial surface 118 extending between the front and rear chamfered surfaces 114, 116. The connection bore 104 terminates at a reduced diameter portion 117 at the rear end 107 of the removable tip 76. The reduced diameter portion 117 terminates in a drive face 120.

Similar to the drill 10 set forth above, the shaft 82 is adapted to be inserted into the connection bore 104. As the shaft 82 is inserted into the bore 104, the opposing external threads 112 enter corresponding flutes 72A in the drill body 74. With the external threads 88 aligned with corresponding internal threads 112, the tip 76 is twisted (for example, clockwise) relative to the drill body 74. As the tip 76 is twisted, the external threads 88 enter into corresponding internal threads 112. Since the front and rear surfaces 90, 92 of each external thread 88 are chamfered and further since the front and rear surfaces 114, 116 of each internal thread 112 are chamfered, the external threads 88 can be guided into the internal threads 112 with relative ease and with minimal interference from the internal threads 112. An interference fit between the drive faces 95, 120 of the external and internal threads 88, 112 locks the removable tip 76 on the drill body 74.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A drill comprising:
   a drill body having a main body portion, a thread, and a reduced diameter portion between said main body portion and said thread; and
   a removable tip having a cutting tip and a thread that is adapted to engage said thread of said drill body,
   wherein one said thread is an internal thread in a connection bore and the other one of said threads is an external thread extending from a shaft,
   said internal thread being defined by a front face, a rear face, and a radial surface extending between said front face and said rear face,
   said external thread being defined by a front face, a rear face, and a radial surface that extends between said front face and said rear face, and
   said shaft being adapted to be inserted in said connection bore and rotated to engage said internal and external threads.

2. The drill according to claim 1, wherein said internal thread and said connection bore are at a front end of said drill body and said external thread and said shaft are at a rear end of said removable tip.

3. The drill according to claim 2, wherein said front and rear faces of said external thread lie in planes that are generally perpendicular to a central axis of said removable tip and said radial surface tapers toward a front end of said removable tip.

4. The drill according to claim 2, wherein said opposing portions of said shaft are non-cylindrical.

5. The drill according to claim 4, wherein said non-cylindrical portions are oriented at an angle of about 35 degrees relative to a central axis of said removable tip.

6. The drill according to claim 2, wherein said radial surface of said internal thread and said radial surface of said external thread each has a diminishing radius that defines a drive face, said drive face of said external thread cooperates with said drive face of said internal thread to form an interference fit between said external thread and said internal thread and transmits a rotating force from said drill body to said removable tip.

7. The drill according to claim 2, wherein said connection bore is provided with a chamfered surface at said front end of said drill body and said shaft is provided with a chamfered surface at said rear end of said removable tip.

8. The drill according to claim 7, wherein said chamfered surfaces are oriented at an angle between about 30 and 45 degrees relative to a central axis of said drill body and said removable tip.

9. The drill according to claim 1, wherein said connection bore has a width and a depth and said shaft has a width and a depth which is dimensioned to fit within the width and the depth of the connection bore.

10. The drill according to claim 1, wherein said drill body and said removable tip each has at least one chip flute therein, said flutes in said drill body being adapted to align with said flutes in said removable tip.

11. The drill according to claim 10, wherein said flutes are spiral flutes.

12. The drill according to claim 1, wherein said front face of said external thread is disposed at an angle relative to a plane extending perpendicularly through a central axis of said drill body.

13. The drill according to claim 12, wherein said drive face starts at a point located in a plane that is at an angle of about 5 degrees relative to a plane passing through a central axis of said drill body and a center of said internal thread.

14. The drill according to claim 1, wherein said removable tip supports cutting edges on a front end thereof.

15. The drill according to claim 1, wherein said external thread and said shaft are at a front end of said drill body and said internal thread and said connection bore are at a rear end of said removable tip.

16. The drill according to claim 15, wherein said shaft is provided with a slot that produces diametrically disposed shaft portions.

17. The drill according to claim 16, wherein said slot is defined by a transverse channel that extends along a central axis of said drill body.

18. The drill according to claim 17, wherein said slot terminates in a transverse bore.

19. The drill according to claim 15, wherein said front face and said rear face of said threads are chamfered.

20. The drill according to claim 15, wherein said connection bore terminates at a reduced diameter portion at said rear end of said removable tip, each said reduced diameter portion terminates in a drive face, said drive face of said drill body being adapted to engage said drive face of said removable tip.

21. The drill according to claim 15, wherein said removable tip has a front end comprising a cutting tip.

22. The drill according to claim 15, wherein said drill body and said cutting tip each has at least one chip flute, said chip flute of said drill body being adapted to align with said chip flute of said removable tip.

23. The drill according to claim 22, wherein said flutes are spiral flutes.

24. The drill according to claim 15, wherein said shaft has a chamfered surface at said front end of said drill body and said connection bore has a shaft at said rear end of said removable tip to assist in guiding said shaft into said connection bore and reducing interference between said shaft and said connection bore.

25. The drill according to claim 15, wherein said shaft has a width and said connection bore has a width which is smaller than the width of said shaft.

* * * * *